J. C. BENTHALL.
Cotton-Picking Shade.
No. 223,468. Patented Jan. 13, 1880.
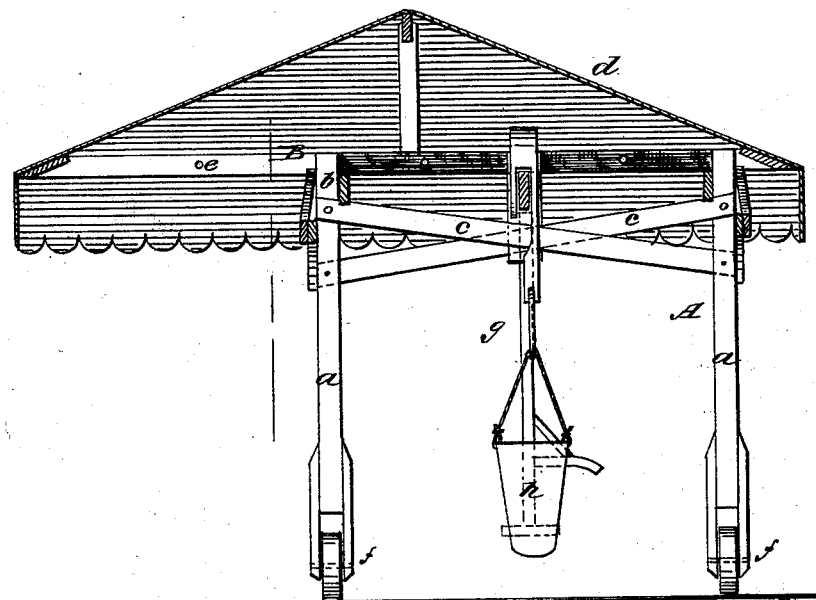
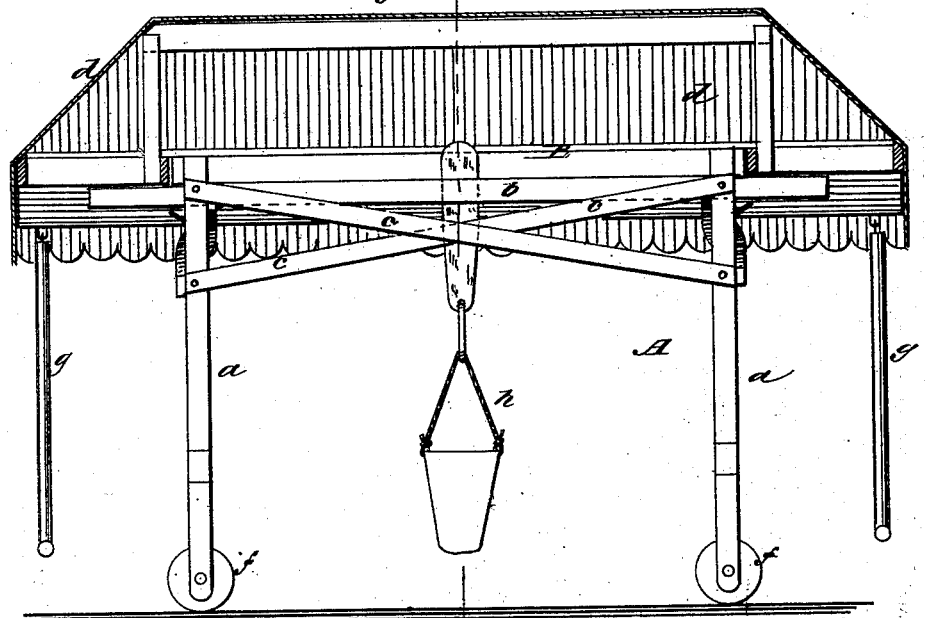
WITNESSES: INVENTOR:

UNITED STATES PATENT OFFICE.

JOHN C. BENTHALL, OF SCHULENBURG, TEXAS.

COTTON-PICKING SHADE.

SPECIFICATION forming part of Letters Patent No. 223,468, dated January 13, 1880.

Application filed July 22, 1879.

*To all whom it may concern:*

Be it known that I, JOHN C. BENTHALL, of Schulenburg, in the county of Fayette and State of Texas, have invented a new and Improved Cotton-Picking Shade, of which the following is a specification.

The object of my invention is to furnish a portable shade or shield for the use of cotton-pickers to protect them from the direct rays of the sun while at work; and the invention consists in a frame-work, mounted on wheels, adapted for moving between the rows of plants, and fitted with an adjustable shade of muslin or other material, whereby a space the width of two rows is shaded at once, and the shade may be adjusted to the position of the sun.

I will describe the construction and operation more particularly in connection with the accompanying drawings, wherein—

Figure 1 is a vertical transverse section of the apparatus. Fig. 2 is a vertical longitudinal section.

Similar letters of reference indicate corresponding parts.

A is a rectangular frame, consisting of four corner-posts, $a$, connected together at the top by cross-bars $b$, and strengthened by cross-braces $c$. These portions are preferably made of wood, in a light form, of a width to inclose two rows of cotton-plants, and of sufficient height to permit work upon the inclosed plants. The length of the frame may be according to convenience.

Upon the bars $b$ of frame A rests a frame, B, which extends beyond the sides and ends of frame A, and is fitted with a covering or shade, $d$, of muslin, canvas, or other similar material. I prefer to fit the frame B with standards and a ridge-pole, over which the covering $d$ is stretched so that it inclines from the center to each side, for the purpose of shedding rain readily.

The frame B rests loosely in place, so that it may be moved sidewise to bring the covering more at one side than the other, according to the position of the sun; and, if desired, the frame B may be fitted on a pivot, so as to swing at an angle, for the same purpose. When adjusted it is held in place by pins inserted through holes in bars $b$, as shown at $e$.

In the lower ends of the corner-posts $a$ there are fitted wheels or rollers $f$, which sustain the apparatus and permit it to be drawn along between the rows as the work progresses. At each end of the frame a handle, $g$, is suspended, for use in shifting the apparatus from place to place.

In use, the apparatus, being light, can be carried and placed in position with the posts $a$ at each side resting on the ground between the rows covered by the shade. The bag for the cotton will be suspended at the center, as shown at $h$, and the work can thus be done while the pickers are protected from the sun.

This apparatus is very useful and convenient, as it obviates the danger to health from working in the sun, and serves also as a protection from rain. The shade also tends to render the work more thorough, as the pickers will naturally strip the inclosed plants instead of hurrying through the rows and dragging the shade along frequently.

I am aware that a portable shade or screen mounted on wheels is an old contrivance, and I therefore do not claim such as my invention; but, Having described my invention, what I do claim is—

The within-described portable cotton-picking shade, consisting of the frame A, formed by the posts $a$, cross-bars $b$, and braces $c$, the wheels $f$, frame B, and flexible covering $d$, the frame with its covering being adjustable laterally upon the bars $b$ of the frame A, and held in place thereon, when adjusted, by pins at $e$, as and for the purpose specified.

JOHN C. BENTHALL.

Witnesses:
S. M. NICHOLS,
ALFRED HENDERSON.